United States Patent

[11] 3,565,254

[72] Inventor John P. Latimer
Newport News, Va.
[21] Appl. No. 856,945
[22] Filed Sept. 11, 1969
[45] Patented Feb. 23, 1971
[73] Assignee Deepsea Ventures, Inc.
Newport News, Va.

[54] APPARATUS FOR CONFINING A SLICK AND COLLECTING OIL THEREFROM
19 Claims, 9 Drawing Figs.

[52] U.S. Cl. .................................. 210/170, 210/242
[51] Int. Cl. .................................. E02b 15/04
[50] Field of Search ....................... 210/(OWD), 24, 39, 40, 170, 242; 61/1, 5, 5 (F)

[56] References Cited
UNITED STATES PATENTS
1,397,891 11/1921 Jones ......................... 210/OWD
2,330,508 9/1943 McColl ....................... 210/OWD
3,219,190 11/1965 Thune ......................... 210/OWD
3,221,884 12/1965 Muller ........................ 210/OWD
3,369,664 2/1968 Dahan ......................... 210/OWD
3,476,246 11/1969 Dahan ......................... 210/OWD
3,503,508 3/1970 Desty et al. ................... 210/OWD
FOREIGN PATENTS
1,032,121 6/1958 Germany ....................... 210/OWD Primary Examiner—Reuben Friedman
Assistant Examiner—C. M. Ditlow
Attorney—David H. Semmes ABSTRACT: Buoyancy means is connected with a body means for retaining the body means in operative position in a body of water. A foot portion extends from the upper part of the body means and extends at an angle downwardly therefrom to define a space between the body means, the foot portion and the surface of the body of water. An air suction means is provided for reducing the pressure in said space and extends lengthwise of the boom. Means for collecting oil is also supported in said space and extends lengthwise of the boom for collecting oil within the space.

INVENTOR
JOHN P. LATIMER

BY Shoemaker and Matlare
ATTORNEYS

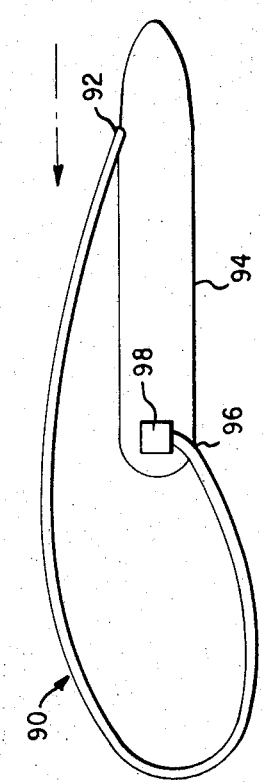
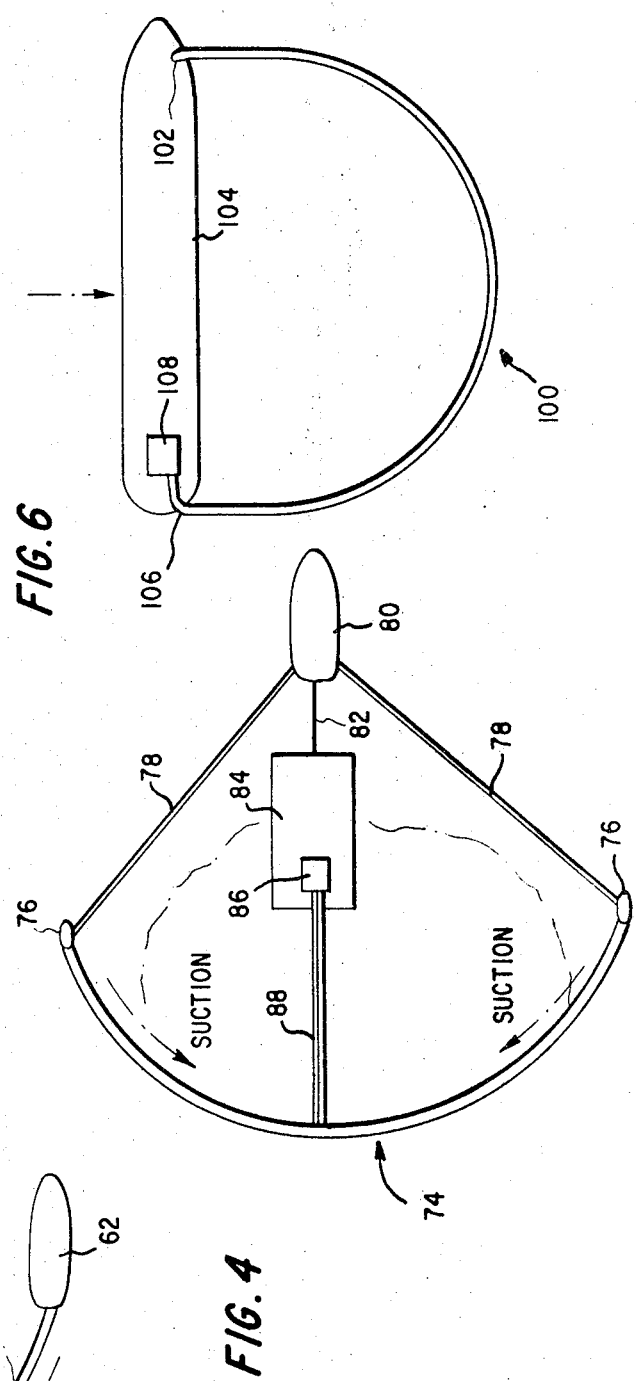
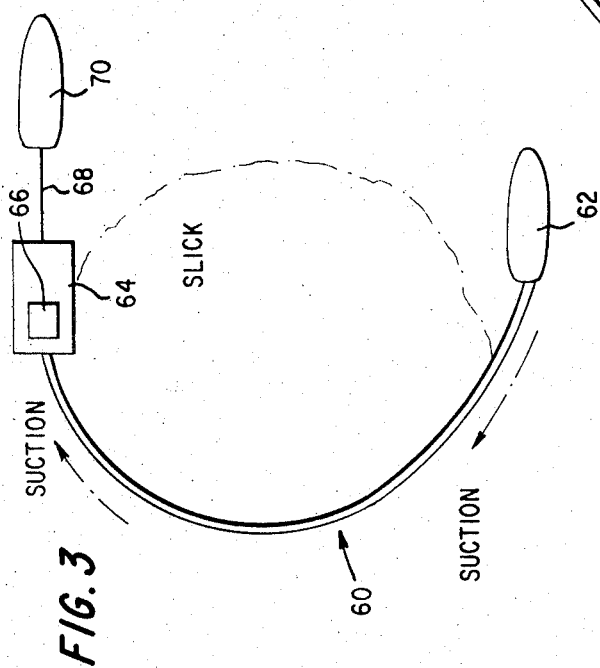
INVENTOR
JOHN P. LATIMER
BY Shoemaker and Mattare
ATTORNEYS

INVENTOR
JOHN P. LATIMER

BY Shoemaker and Mattare
ATTORNEYS

APPARATUS FOR CONFINING A SLICK AND COLLECTING OIL THEREFROM

BACKGROUND OF THE INVENTION

The present invention is directed to a slick confining boom adapted to confine and prevent the spread of oil on the surface of water. Oil which has inadvertently escaped and which lies on the surface of water is often driven by winds and tides into undesirable areas and may be carried ashore where it can do considerable damage to wildlife and property and wherein a serious pollution situation is created. The problem has been compounded by the advent of offshore oil well drilling and the development of present day super tankers whereby very large quantities of oil may escape due to accidental leakage.

It has accordingly been necessary to develop means by which the slick can be confined so as to prevent spread of the oil and to enable the oil to be collected and disposed of. Slick confining booms for this purpose may be of relatively great length ranging from a few hundred feet to several thousand feet or more in length.

Various designs have been employed in the construction of slick confining booms to prevent the spread of oil spilled on the surface of water. The booms thus far manufactured, although differing in materials and details of construction, have consisted essentially of a device of necessary length that floats on the surface of a body of water and has a skirt that extends downwardly from a few inches to a few feet, and a vertically upward projecting portion that extends from a few inches to a foot or more upward from the surface of the water. Some form of buoyancy is incorporated in these devices so that at least in smooth water they float with the skirt immersed to the design depth.

When such booms are used to retain an oil spill, the ends are normally attached to fixed or stationary structures in such a manner that the boom lies across the path of spreading oil. Currents and winds create tension forces along the boom, which are conveyed to the structures to which the ends of the boom are attached. The tension forces along the boom may be borne by the material in the skirt and the above-water portion, or by ropes or other strength members contiguously attached to them.

It should be noted that if such booms are exposed to wind or current, a sufficient length must be used to permit the boom to trail in an arc or catenary between fixed end points. Otherwise, the lateral tension along the boom becomes excessive and it is pulled apart.

Various devices have been developed to e remove oil from the surface of a body of water. Most of such devices are attached to or are incorporated in the design of relatively small vessels. The effectiveness of such devices is reduced when they are required to sweep large areas to remove thin films of oil.

It is accordingly desirable to provide a construction which facilitates removal of oil over relatively large areas, minimizing the amount of sweeping required, while employing a compact pumping arrangement which can be incorporated on a relatively small vessel.

SUMMARY OF THE INVENTION

In the present invention, a body means is operatively connected with buoyancy means for retaining the body means in operative position in a body of water. Foot means is carried by the body means and extends downwardly at an angle therefrom to define a space between the body means, the foot means and the surface of the body of water. Means is provided for reducing the pressure within said space to facilitate accumulation of a large quantity of oil adjacent to the body means. The means for reducing pressure in said space extends lengthwise of the boom so that oil can be collected substantially throughout the entire length of the boom.

Means is provided which also extends lengthwise of the boom for collecting oil substantially throughout the length of the boom, whereby considerable quantities of oil can be removed by a single pumping unit.

Various towing and mooring arrangements are possible when utilizing the confining and collecting arrangement of the present invention, whereby maximum versatility is afforded to solve problems occurring under widely varying operating conditions.

The means for reducing the pressure within the space bounded by the foot means and the body means causes a flow of air under the foot means along its length, into said space, both of which effects facilitation of the accumulation of a large quantity of oil adjacent to the body means.

BRIEF DESCRIPTION OF THE DRAWINGS

FIG. 3 is a schematic view illustrating a first towing arrangement;

FIG. 4 is a schematic view illustrating a further towing arrangement;

FIG. 5 is a schematic view illustrating a towing and mooring arrangement;

FIG. 6 is a schematic view illustrating a further variation of the towing and mooring arrangement shown in FIG. 5;

DESCRIPTION OF THE PREFERRED EMBODIMENTS

Figure 1:
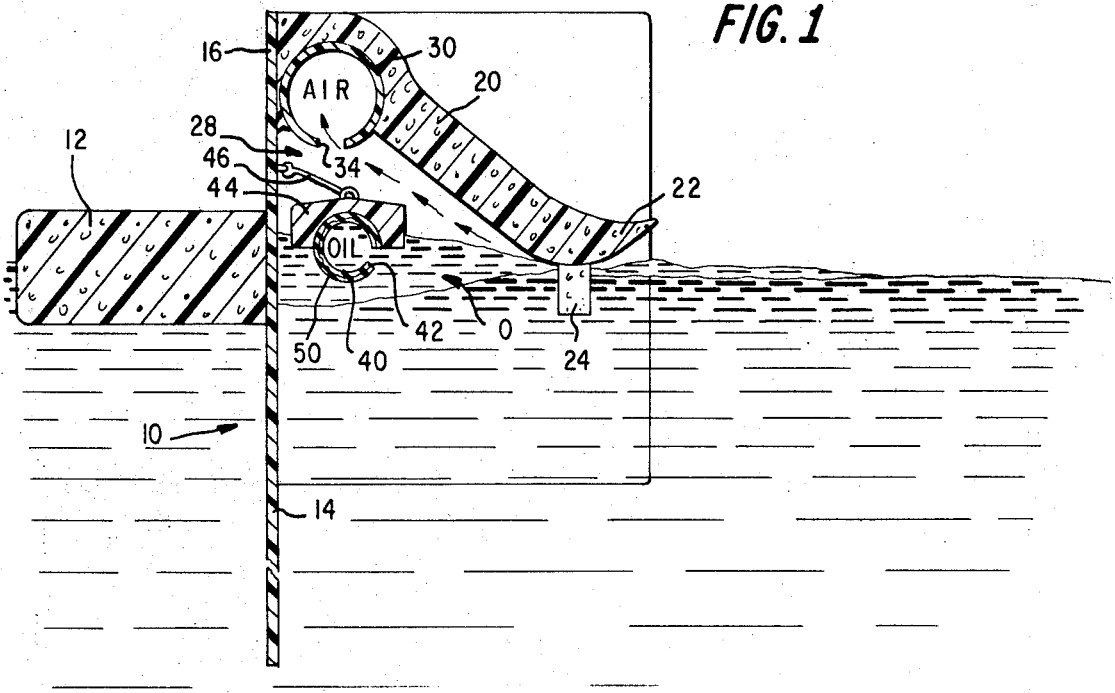
FIG. 1 is a sectional view through a slick confining boom according to the present invention.
Figure 2:
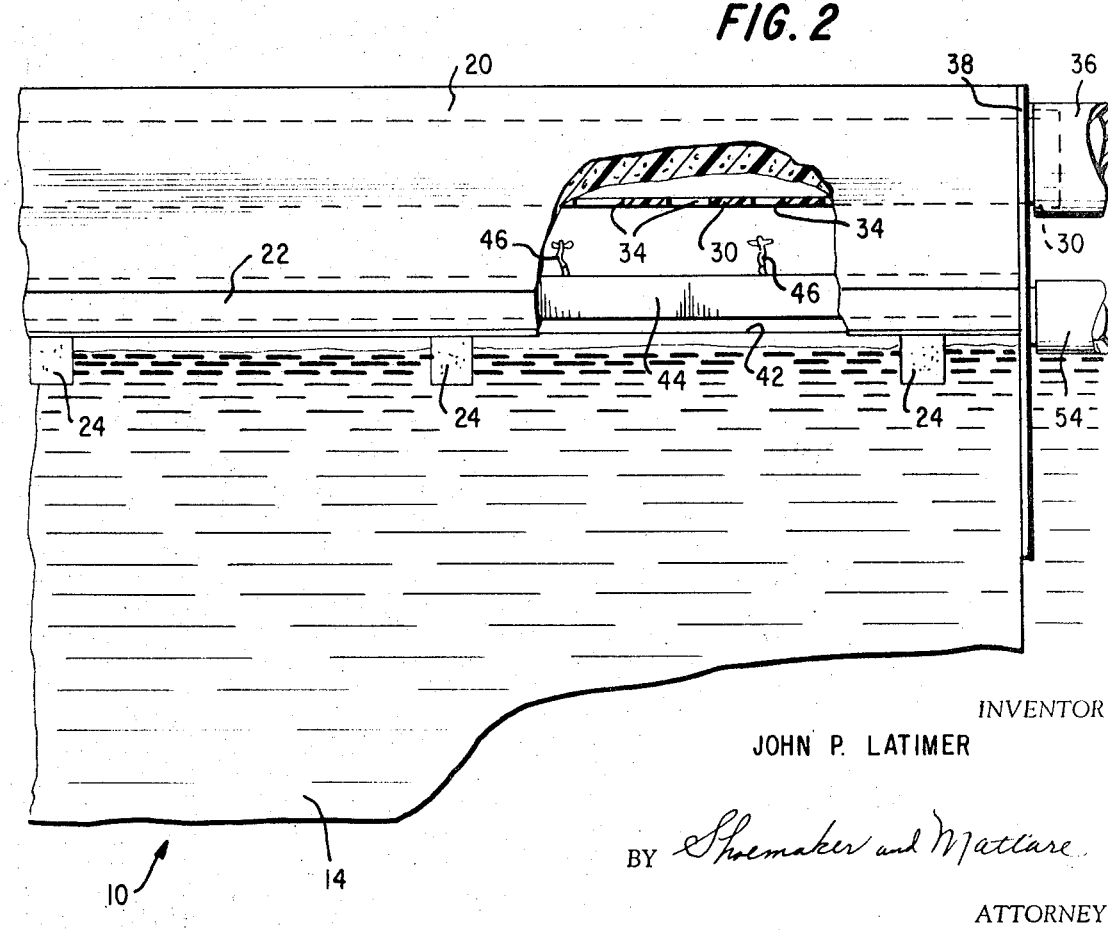
FIG. 2 is an end view of the structure shown in FIG. 1, partially broken away for the purpose of illustration.

Referring now to the drawings wherein like reference characters designate corresponding parts throughout the several views, the slick confining boom of the present invention is illustrated in FIGS. 1 and 2 and includes a body means indicated generally by reference numeral 10 of elongated continuous construction which may be formed, for example, of a suitable plastic material. The body means is substantially vertically disposed when in operative position in a body of water as illustrated in FIG. 1. A buoyancy means 12 in the form of an elongated continuous body of buoyant material, such as plastic foam is secured to one face of body means 10 as by bonding, and extends substantially normally thereto.

When the body means is supported in operative position, the body means defines a depending skirt 14 extending below the surface of a body of water and an upwardly extending portion 16 which extends above the surface of the body of water.

A foot portion 20 is secured to the upper part of the upwardly extending portion 16 of the body means as by bonding and extends downwardly at an angle thereto and terminates in an outer upwardly directed portion 22. A plurality of spaced buoyancy members 24 are secured, as by bonding, to the undersurface of the foot portion. The foot portion is formed of a suitable flexible material such as plastic foam, and the material of the foot portion, in combination with the buoyancy means 24, enables the undersurface of the foot portion to ride very lightly on the surface of the body of water or of the slick as the case may be.

A space 28 is defined between the foot portion, the body means and the surface of the water. Means is provided for reducing the pressure in space 28 and comprises an elongated tubular member 30 of substantially cylindrical cross-sectional configuration which is suitably held in position such as by being embedded within the foot portion. A plurality of spaced holes 34 are formed through the wall of tubular member 30 and provide communication between the interior of tubular member 30 and space 28. As seen in FIG. 2, the size of the holes 34, which are in the form of elongated slots, increases from the right toward the left as seen in this FIG.

A suitable flexible conduit means 36 is connected between one end of tubular member 30 and a blower with high volumetric capacity (not shown) which is adapted to produce an air suction vacuum of approximately three inches of water to thereby produce constant suction within tubular member 30 during operation of the apparatus to thereby reduce the pressure within space 28. An end wall 38 is provided at one end of the boom so as to seal against air leakage with respect to space 28, whereby the reduced pressure within space 28 can be maintained. It should be understood that a similar end wall is provided at the opposite end of the boom.

The size of holes 34, accordingly, increases in a direction away from the blower so as to maintain approximately the same amount of air flow under all parts of the foot portion to thereby maintain a substantially constant pressure throughout space 28.

As seen in FIG. 1, the reduced pressure in space 28 enables the layer of oil, indicated by reference character O, to be of increased thickness within space 28 whereby the oil accumulates in such space to thereby facilitate collection of the oil.

Means is provided for collecting oil in space 28 in the form of an elongated tubular member 40 having a continuous slot 42 formed therein which provides communication with space 28 and the oil therewithin. Tubular member 40 is suitably connected as by bonding to a buoyant support means 44 which is adapted to float on the surface of the oil within space 28. This buoyant support means is interconnected with the body means by a plurality of flexible tether members 46 having the opposite ends thereof connected to the support means and the body means respectively.

Flexible electrical elements 50 are embedded within tubular member 40 and are adapted to be energized when heavy oil is being handled so as to heat tubular member 40 and the oil therewithin.

One end of tubular member 40 is connected by a flexible conduit 54 with a suitable high volumetric capacity pumping unit (not shown) capable of handling oil, water and air.

Referring now to FIG. 3 of the drawings, a first towing arrangement is illustrated. A boom constructed in accordance with the present invention is indicated generally by reference numeral 60 and has one end thereof connected with a suitable ship such as a tugboat 62. The opposite end of the boom is connected with a barge 64 which supports a unit 66 including pumping means for pumping the oil and air suction means for reducing the pressure in the space 28 within the boom. Barge 64 is, in turn, connected by a tow line 68 with a second ship such as a tugboat 70.

Referring now to FIG. 4, a second towing arrangement is illustrated wherein a boom according to the present invention is indicated generally by reference character 74. Opposite ends of the boom are connected to mine-sweeping-type towing floats or paravanes 76. These paravanes are connected by tow lines 78 with a ship 80, such as a tugboat or the like. Ship 80 is connected by tow line 82 to a barge 84 which supports a unit 86 including pumping means for pumping oil and air suction means for reducing the pressure in the space 28 within the boom. Unit 86 is connected by conduit means 88 with the boom.

Referring now to FIG. 5, a mooring arrangement is illustrated wherein a boom 90 is provided according to the present invention. One end of the boom is secured at a point 92 to a damaged ship 94. The opposite end of the boom is connected to the ship at a point 96 and is also connected with a unit 98 including pumping means for pumping oil and air suction means for reducing the pressure within the space 28 within the boom. The wind and current direction are indicated by the arrow in this FIG.

FIG. 6 illustrates an arrangement similar to FIG. 5 for use with a stranded or damaged ship. A boom 100 according to the present invention is connected at point 102 with a ship 104. The opposite end of the boom is connected at a point 106 with the ship and is also connected with a unit 108 which includes pumping means for pumping oil and air suction means for reducing the pressure within the space 28 within the boom. The direction of the wind and current is indicated by the arrow in this FIG.

Figure 7:
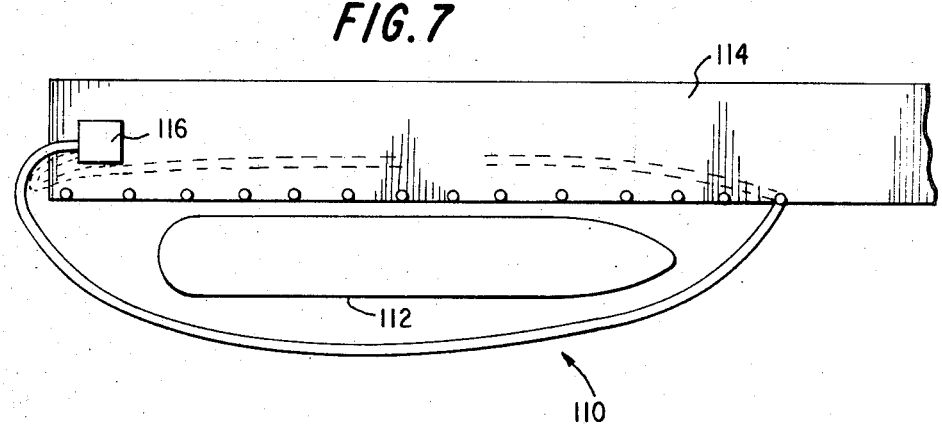
FIG. 7 is a schematic view illustrating a mooring arrangement.

Referring now to FIG. 7, a further mooring arrangement is shown wherein a boom according to the present invention is indicated by reference character 110 and is disposed in surrounding relationship to a ship 112 disposed adjacent a pier 114. Opposite ends of the boom are connected to a unit 116 supported on the pier, this unit including pumping means for pumping oil and air suction means for reducing the pressure within the space 28 within the boom.

Figure 8:
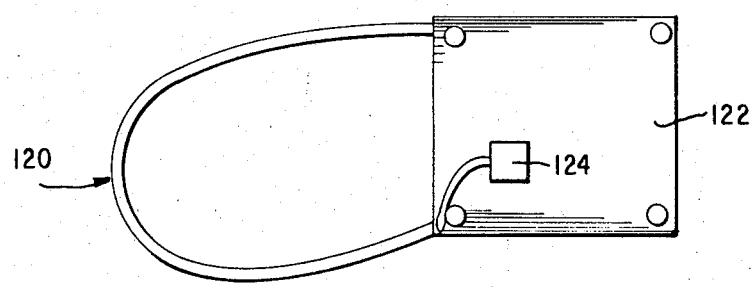
FIG. 8 is a schematic view illustrating a further mooring arrangement.

Referring now to FIG. 8, a further mooring arrangement is illustrated wherein a boom 120 according to the present invention has the opposite ends thereof connected with an offshore drilling platform 122, one end of the boom also being interconnected with a unit 124 supported on the platform. This unit includes pumping means for pumping oil and air suction means for reducing the pressure within the space 28 within the boom. The direction of the current is indicated by the arrow in this FIG.

Figure 9:
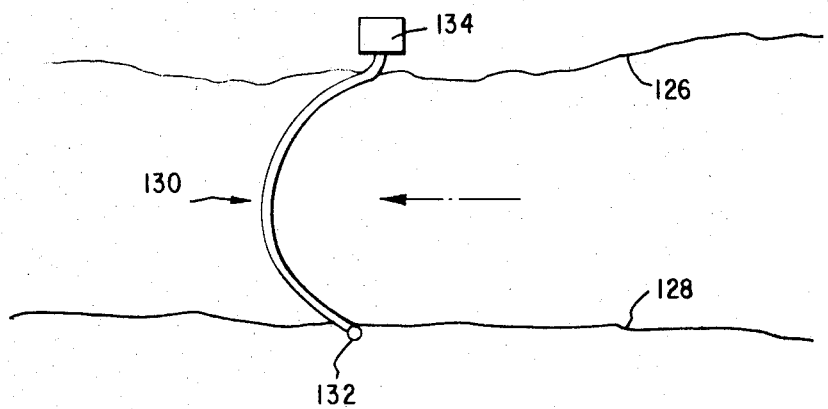
FIG. 9 is a schematic view illustrating still another mooring arrangement.

Referring now to FIG. 9 of the drawings, a mooring arrangement is illustrated for use with a river having opposite shorelines 126 and 128. A boom 130 according to the present invention has a first end thereof secured to a fixed position 132 disposed at one side of the river. The opposite end of the boom is secured at a fixed point at the other side of the river and is interconnected with a unit 134 including pumping means for pumping oil and air suction means for reducing the pressure in the space 28 within the boom. It will be noted that the boom is disposed in spanning relationship to the river so as to intercept any slick passing down the river. The direction of flow of the river is indicated by the arrow in this FIG.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A slick confining boom comprising a body means including a depending skirt adapted to extend below the surface of a body of water and also including an upwardly extending portion adapted to extend above the surface of a body of water, buoyancy means for retaining said body men means in operative position in a body of water, a foot portion carried by the upwardly extending portion of said body means and extending downwardly at an angle therefrom to define a space between said foot portion, said body means and the surface of a body of water, means for reducing the pressure in said space, and means for collecting and removing oil from the surface of water within said space.

2. Apparatus as defined in claim 1, wherein said foot portion extends downwardly at an angle such as to rest on the surface of a body of water at a point spaced upstream of said body means.

3. Apparatus as defined in claim 1, wherein said foot portion is of flexible construction.

4. Apparatus as defined in claim 1, wherein the outer part of said foot portion is inclined upwardly.

5. Apparatus as defined in claim 1, wherein said means for reducing pressure in said space extends lengthwise of said boom.

6. Apparatus as defined in claim 5, wherein sand means for reducing pressure in said space is of tubular construction and has a plurality of holes opening into said space.

7. Apparatus as defined in claim 6, wherein said holes increase in size in accordance with the distance from one end of said boom.

8. Apparatus as defined in claim 1, wherein said means for collecting oil extends lengthwise of said boom.

9. Apparatus as defined in claim 8, wherein said means for collecting oil is of tubular construction and is in communication with oil in said space.

10. Apparatus as defined in claim 9, including buoyant support means for said means for collecting oil.

11. Apparatus as defined in claim 10, including a plurality of tether members for connecting said buoyant support means to said body means.

12. Apparatus as defined in claim 11, wherein said tether members are of flexible construction.

13. Apparatus as defined in claim 1, including heating means for heating the means for collecting oil.

14. Apparatus as defined in claim 1, including a pair of ships operatively connected with opposite ends of said boom to tow the boom, pumping means operatively connected with said means for collecting oil, and air suction means operatively connected with said means for reducing pressure in said space.

15. Apparatus as defined in claim 1, including a ship, said ship being operatively connected with a pair of spaced towing floats, said floats being operatively connected with opposite ends of said boom, pumping means operatively connected with said means for collecting oil, and air suction means operatively connected with said means for reducing pressure in said space.

16. Apparatus as defined in claim 1, including a ship, opposite ends of said boom being connected to said ship, pumping means operatively connected with said means for collecting oil and air suction means operatively connected with said means for reducing pressure in said space.

17. Apparatus as defined in claim 1, including a fixed means, opposite ends of said boom being connected to said fixed means, said boom being disposed in surrounding relationship to a ship, pumping means operatively connected with said means for collecting oil and air suction means operatively connected to said means for reducing pressure in said space.

18. Apparatus as defined in claim 1, including an offshore drilling platform, opposite ends of said boom being operatively connected with said drilling platform, pumping means operatively connected with said means for collecting oil and air suction means operatively connected with said means for reducing pressure in said space.

19. Apparatus as defined in claim 1, including fixed means disposed on the opposite shores of a river, opposite ends of said boom being connected to said fixed means with the boom in spanning relationship to said river, pumping means operatively connected with said means for collecting oil and air suction means operatively connected with said means for reducing pressure in said space.